(12) United States Patent
Sohn

(10) Patent No.: US 7,738,052 B2
(45) Date of Patent: Jun. 15, 2010

(54) LIQUID CRYSTAL DISPLAY DEVICE

(75) Inventor: Jeong Woo Sohn, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 445 days.

(21) Appl. No.: 11/647,110

(22) Filed: Dec. 27, 2006

(65) Prior Publication Data
US 2007/0279546 A1 Dec. 6, 2007

(30) Foreign Application Priority Data
May 30, 2006 (KR) .................. 10-2006-0048551

(51) Int. Cl.
*G02F 1/1333* (2006.01)
(52) U.S. Cl. ........................................ 349/58
(58) Field of Classification Search ............ 349/58, 349/60
See application file for complete search history.

(56) References Cited

U.S. PATENT DOCUMENTS

| 7,443,460 B2 * | 10/2008 | Park | 349/58 |
| 2004/0125267 A1 * | 7/2004 | Noh | 349/58 |
| 2005/0068470 A1 * | 3/2005 | Won | 349/58 |

FOREIGN PATENT DOCUMENTS

| CN | 1475846 | 2/2004 |
| CN | 1603905 | 4/2005 |
| JP | 11-306835 | 11/1999 |

OTHER PUBLICATIONS

Office Action issued in corresponding Chinese Patent Application No. 2006101606620; issued Jun. 20, 2008.

* cited by examiner

*Primary Examiner*—Uyen-Chau N Le
*Assistant Examiner*—Chris H Chu
(74) *Attorney, Agent, or Firm*—Brinks Hofer Gilson & Lione

(57) ABSTRACT

An LCD device is disclosed, which prevents optical sheets from being wrinkled. The LCD device includes an LCD panel displaying images, a back light unit including optical sheets for irradiating light to the LCD panel, and a support main receiving the LCD panel and the back light unit, partially overlapping side portions of the optical sheets, and having inclined edge surfaces at four corners to obtain a gap with the optical sheets.

9 Claims, 4 Drawing Sheets

LIQUID CRYSTAL DISPLAY DEVICE

This application claims the benefit of the Korean Patent Application No. 10-2006-48551, filed on May 30, 2006, which is hereby incorporated by reference as if fully set forth herein.

BACKGROUND

1. Technical Field

The present invention relates to a liquid crystal display (LCD) device, and more particularly, to an LCD device that prevents optical sheets from being wrinkled.

2. Discussion of the Related Art

Generally, an LCD device includes an LCD module, a driving circuit for driving the LCD module, and a case.

The LCD module includes an LCD panel and a back light unit, wherein the LCD panel includes liquid crystal cells and switching devices, and the back light unit irradiates light to the LCD panel. The liquid crystal cells are arranged in a matrix arrangement and inject a liquid crystal between two glass substrates bonded to each other with a certain gap, and the switching devices respectively switch signals supplied to the liquid crystal cells.

Furthermore, the LCD module includes optical sheets arranged to vertically raise light forwarded from the back light unit to the LCD panel.

The LCD panel, the back light unit and the optical sheets should be fixed to one another in a single body to avoid light loss and also should be protected from damage caused by external impact.

To this end, a case top for LCD device has been provided to encircle the back light unit and the optical sheets including the edge of the LCD panel.

As described above, since the LCD module includes the glass substrates, it is likely that the LCD module may be damaged by external impact. To prevent the LCD module from being damaged by external impact, the case top has been used to protect the outside of the LCD module.

FIG. 1 is an exploded perspective view illustrating a general LCD device.

As shown in FIG. 1, the general LCD device includes an LCD panel 30 displaying images, a fluorescent lamp 31 generating light, a lamp housing 32 encircling the fluorescent lamp 31 in a U shape, a diffusion plate 38, a first prism sheet 37, a second prism sheet 36, a protective sheet 35, a light guide plate 33, and a reflection plate 34. The diffusion sheet, the first prism sheet 37, the second prism sheet 36, the protective sheet 35, the light guide plate 33, and the reflection sheet 34 are sequentially fixed to one surface of the LCD panel 30.

The LCD device further includes a support main 39 receiving and fixing the LCD panel 30 and the back light unit.

The fluorescent lamp 31, the lamp housing 32, the diffusion plate 38, the first prism sheet 37, the second prism sheet 36, the protective sheet 35, the light guide plate 33, and the reflection sheet 34 are referred to as the back light unit.

Meanwhile, the back light unit serves to irradiate light to a display area A of the LCD panel 30. Although not shown, the display area A of the LCD panel includes two transparent substrates provided with polarizers on outer surfaces, and a liquid crystal injected between inner surfaces of the two transparent substrates.

The LCD device further includes a driving circuit 40 driving the display area.

The operation of the back light unit will be described below. If the fluorescent lamp 31 provided on one end of the light guide plate 33 is turned on, light generated from the fluorescent lamp 31 is reflected by the lamp housing 32, and the reflected light is transferred to the end of the light guide plate having no fluorescent lamp through the end of the light guide plate. The light is scattered over the whole surface of the light guide plate 33, and the light is irradiated to the display area of the LCD panel through the diffusion plate 38.

In the LCD device, a thin film transistor formed in the LCD panel controls pixels in accordance with a signal of the driving circuit to selectively pass through the light irradiated to the display area. Images are displayed in the display area of the LCD panel by the pixels which have selectively passed through the light.

Hereinafter, a related art LCD device will be described with reference to the accompanying drawings.

FIG. 2 is a plane view illustrating the related art LCD device and FIG. 3 is an exploded sectional view illustrating the LCD device, taken along line II~II' of FIG. 2.

As shown in FIGS. 2 and 3, the related art LCD device includes a support main 2, a back light unit, an LCD panel 10, a cover bottom 14 encircling the bottom and a side of the support main 2, and a case top 16 formed to encircle the edge of the LCD panel 10 and the cover bottom 14. The back light unit and the LCD panel are stacked inside the support main 2.

The support main 2 is a mold and its sidewall is formed by a stair shaped edge surface. The back light unit is provided at the lowest layer inside the support main 2, and the LCD panel 10 is provided on the back light unit.

Also, the LCD panel 10 includes a lower substrate 10b packaged with switching devices (TFTs), and an upper substrate 10a provided with a color filter. A liquid crystal is injected between the lower substrate 10b and the upper substrate 10a. Lower and upper polarizers 22 and 24 are provided below and above the LCD panel 10.

The lower polarizer 22 provided below the LCD panel 10 polarizes light beams supplied from the back light unit and supplies the polarized light beams to the LCD panel 10. The upper polarizer 25 provided above the LCD panel 10 polarizes light beams supplied from the LCD panel 10 and emits the polarized light beams to the outside.

Furthermore, the cover bottom 10 is provided to encircle the bottom and the side of the support main 2. The case top 16 is provided to encircle the top and the side of the support main 2 to fix the support main 2 and the LCD panel 10 to each other.

The back light unit includes a lamp housing 18 provided with a light source 20, a light guide plate 6 converting light emitted from the light source 20 into surface light, optical sheets 12 fixed onto the light guide plate 6 to improve efficiency of the light emitted to the LCD panel 10, and a reflection plate 4 fixed to a rear surface of the light guide plate 6 to reflect the light emitted to the rear surface of the light guide plate 6 toward the LCD panel 10.

Furthermore, the light source 20 corresponds to a power source supplied from an outer power generator and supplies predetermined light to the light guide plate 6. At this time, light beams emitted from the light source 20 to the opposite side of the light guide plate 6 are reflected by the lamp housing 18 and enter the light guide plate 6.

In this case, the light guide plate 6 uniformly distributes the light emitted from the light source 20 over its whole area. In other words, the light guide plate 6 allows uniform light to enter the LCD panel 10 by uniformly distributing the light emitted from the light source 20.

Furthermore, the reflection plate 4 reflects the light emitted to the lower side of the light guide plate. In other words, the reflection plate 4 reflects the light emitted from the light guide plate 6 and thus allows the light to be supplied to the LCD panel 10.

The optical sheets 12 include upper/lower diffusion sheets and upper/lower prism sheets. The optical sheets 12 scatter the light emitted from the light guide plate 6 to allow the light to be uniformly distributed over the surface of the light guide plate. Also, the optical sheets 12 refract and condense the scattered light to increase surface luminance and diffuse the light, thereby obtaining a wide viewing angle.

The support main 2 partially overlaps side portions of the optical sheets 12 to fix the optical sheets 12.

In the aforementioned related art LCD device, the support main 2 has a rectangular shape so that the back light unit including the optical sheets 12 can be inserted thereto.

The light guide plate 6 provided in the support main 2 supplies the light supplied to a light incident portion 30 to the LCD panel 10, so that predetermined images are displayed on the LCD panel 10.

A recent trend of the LCD device is toward a thin and lightweight size. Particularly, the LCD device packaged in a notebook computer essentially requires a thin and lightweight size to allow a user to easily carry it.

However, the support main sagged due to a hook fitting structure with the cover bottom interferes with the optical sheets 12. For this reason, the optical sheets are wrinkled under a high temperature.

A gap between the optical sheets 12 and the support main 2, but if the gap has a too large size, a defect such as wrinkle occurs, which causes another side effect.

Furthermore, the support main supporting the panel in an area excluding an active area corresponding to an image display area is susceptible to bending in view of its structure. Such bending of the support main occurs more seriously in four corners.

SUMMARY

Accordingly, the present invention is directed to an LCD device that substantially obviates one or more problems due to limitations and disadvantages of the related art.

An LCD device according to an aspect of the present invention includes an LCD panel configured to display images and a back light unit includes optical sheets for irradiating light to the LCD panel. A support main partially overlaps side portions of the optical sheets and is configured to receive the LCD panel and the back light unit. The support main has inclined edge surfaces at four corners to create a gap with the optical sheets.

In another aspect of the invention, an LCD device includes optical sheets configured to irradiate light to an LCD panel and a support main partially overlapping side portions of the optical sheets. The support main has inclined edge surfaces at four corners thereof that create a gap between the inclined edge surfaces and the side portions of the optical sheets.

In yet another aspect of the invention, an LCD device includes a support main configured to receive an LCD panel and to receive optical sheets that irradiate light to the LCD panel. The support main includes inclined edge surfaces at four corners thereof that create a gap between the inclined edge surfaces and side portions of the optical sheets.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
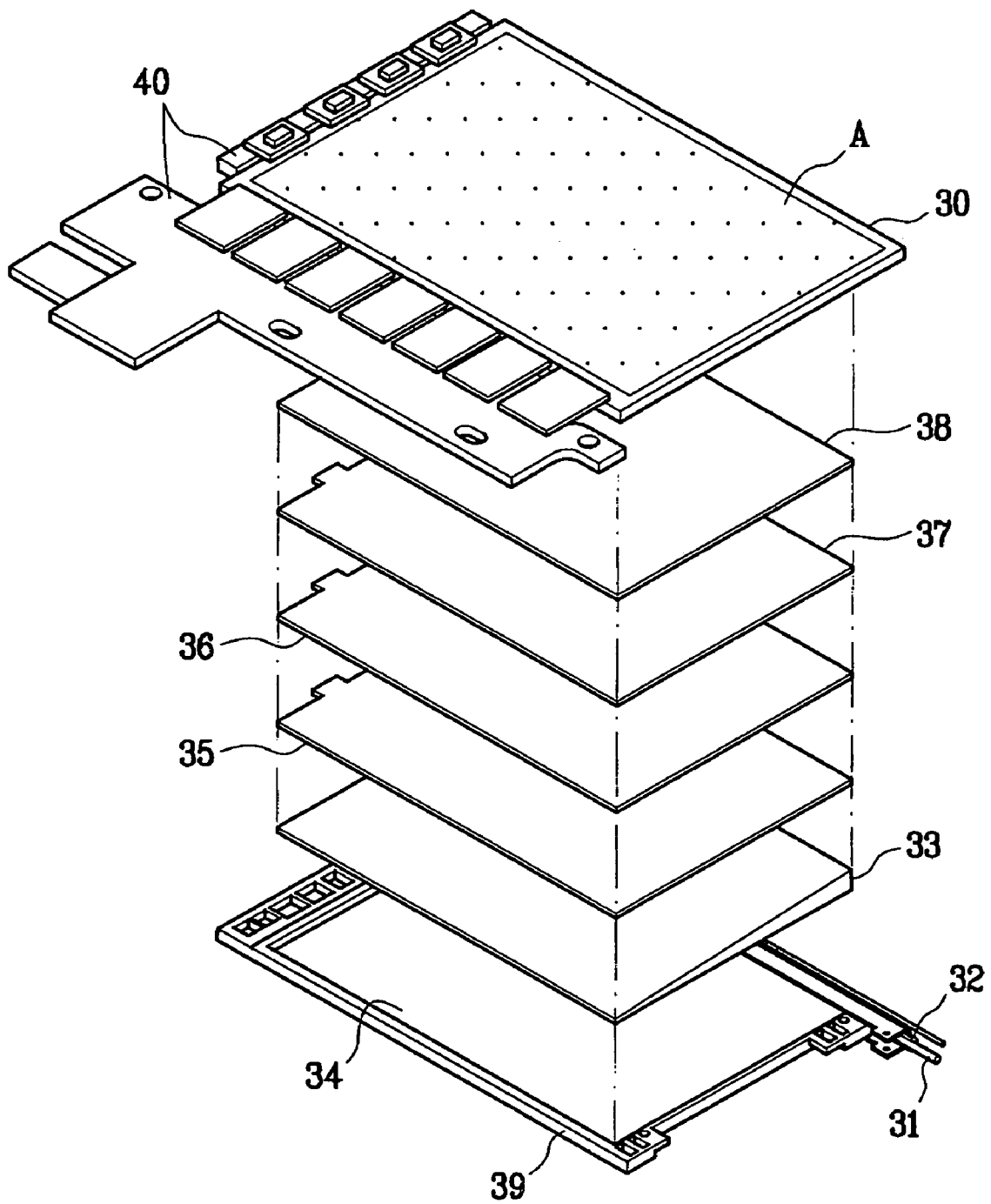
FIG. 1 is an exploded perspective view illustrating a general LCD device.
Figure 2:
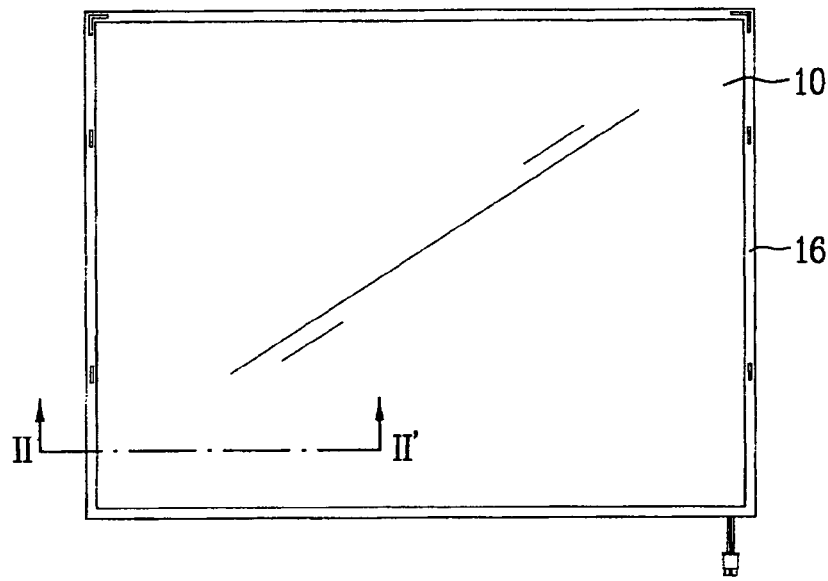
FIG. 2 is a plane view illustrating a related art LCD device.
Figure 3:
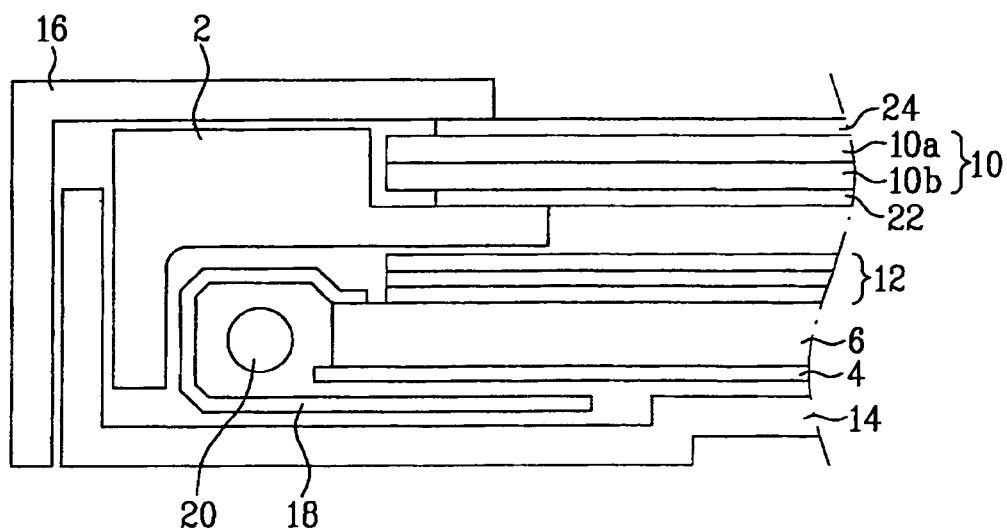
FIG. 3 is an exploded sectional view illustrating the related art LCD device, taken along line II~II' of FIG. 2.
Figure 4:
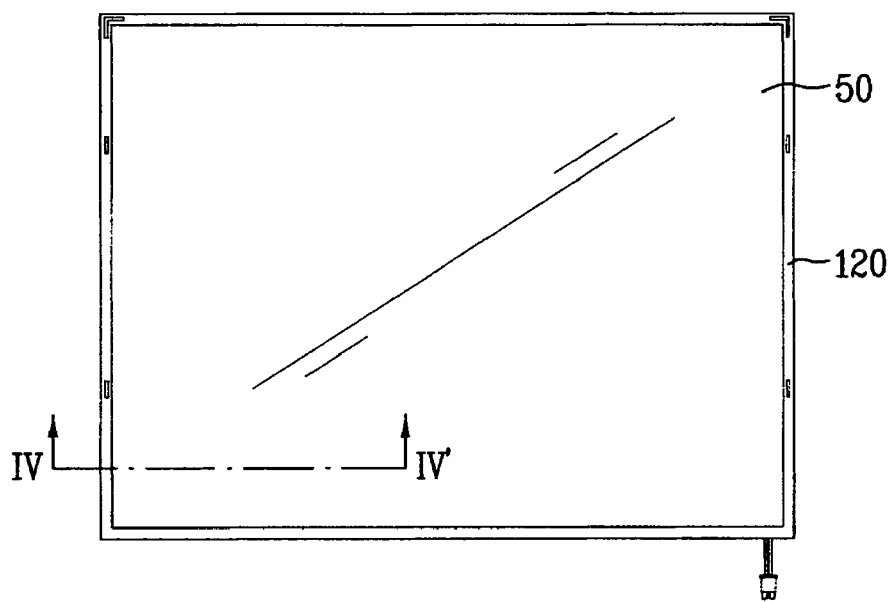
FIG. 4 is a plane view illustrating an LCD device according to an aspect of the present invention.
Figure 5:
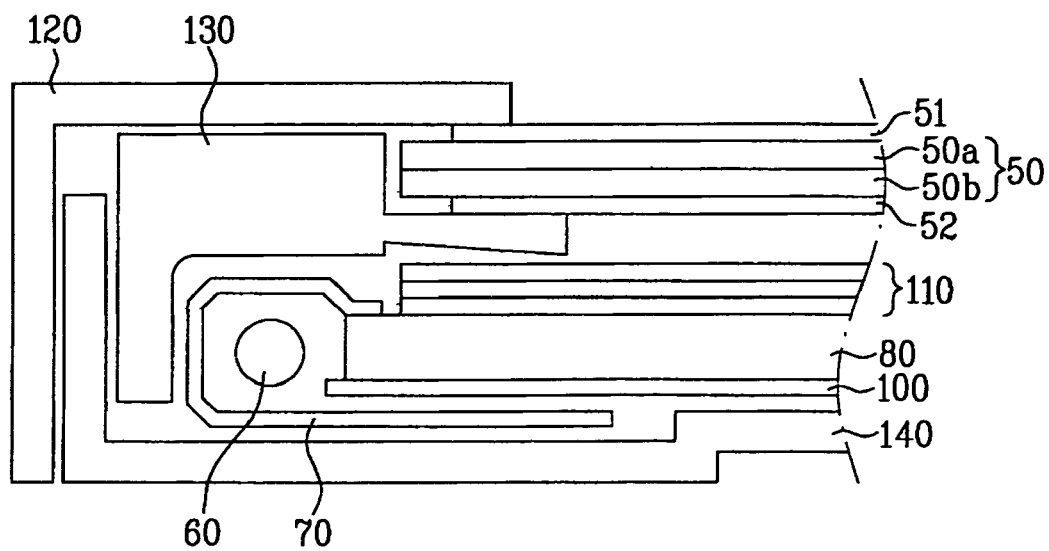
FIG. 5 is an exploded sectional view illustrating an LCD device taken along line IV-IV' of FIG. 4.

FIG. 4 is a plane view illustrating an LCD device according to an aspect of the present invention, and FIG. 5 is an exploded sectional view illustrating an LCD device taken along line IV-IV' of FIG. 4.

As illustrated in FIGS. 4 and 5, the LCD device according to the present invention includes an LCD panel 50 displaying images, a fluorescent lamp 60 generating light, a lamp housing 70 partially encircling the fluorescent lamp 60 in a U shape, a light guide plate 80 guiding the light emitted from the fluorescent lamp 60 to the LCD panel 50, a reflection plate 100 disposed below the light guide plate 80 to reflect the light, which is advancing toward the lower surface of the light guide plate 80, toward an upper surface of the light guide plate 80, optical sheets 110 disposed on the light guide plate 80 to uniformly diffuse and scatter the light passed through the light guide plate 80 to the LCD panel 50, a support main 130 receiving the LCD panel 50, the optical sheets 110 and the light guide plate 80, overlapping side portions of the optical sheets 110, and having certain inclines at four corners to obtain a gap with the optical sheets 110, and a cover bottom 140 encircling the bottom and the side of the support main 130.

A cold cathode fluorescent lamp is preferably used as the fluorescent lamp 60, and the light generated from the fluorescent lamp 60 enters the light guide plate 80 through the incident surface existing at the side of the light guide plate 80. Since the lamp housing 70 is made of metal such as aluminum having good reflectivity, the lamp housing 70 reflects the light from the fluorescent lamp 60 toward the incident surface of the light guide plate 80.

In the LCD device, a prism light guide plate having a prism shaped emitting surface may be used as the light guide plate 80. The prism shaped emitting surface has an inclined rear surface, a peak and a recess, wherein the peak and the recess are formed in a linear or circular shape. In other words, the emitting surface of the light guide plate 80 is provided with a plurality of prisms having peaks and recesses, formed in a linear or circular shape. Accordingly, an x component and a y component of the light entering the light guide plate 80 having a linear or circular shaped prism can be entered in a Z direction, such as a vertical direction of the LCD panel.

Thus, prism sheets conventionally used are not required in the present invention as the prism light guide plate is used instead. Since no prism sheets are used, the number of optical parts is reduced. Also, the intensity of radiation consumed due to the prism sheets can be reduced. Moreover, the incident light from the light guide plate 80 reaches a place far away from the fluorescent lamp 60. The light guide plate 80 is neither easily deformed nor broken due to its high intensity and is formed of acryl resin (PMMA) having good transmissivity.

In the LCD device, the reflection plate 100 formed on the rear surface of the light guide plate 80 serves to reduce light loss by re-reflecting the incident light exiting through the rear surface of the light guide plate 80 back toward the light guide plate 80.

Furthermore, the LCD panel 50 includes a lower substrate 50b packaged with switching devices (TFTs), an upper substrate 50a provided with a color filter, and upper and lower polarizers 51 and 52 respectively formed on front and rear surfaces of the LCD panel 50.

The lower polarizer 52 provided below the LCD panel 50 polarizes light beams supplied from the back light unit and supplies the polarized light beams to the LCD panel 50. The upper polarizer 51 provided above the LCD panel 50 polarizes light beams supplied from the LCD panel 50 and emits the polarized light beams to the outside.

In the LCD device, a case top 120 of metal material is formed to cover the side of the cover bottom 140 and the edge of the LCD panel 50.

The support main 130 is a mold and its sidewall is formed by a stair shaped edge surface. The LCD panel is disposed on the edge surface, and the side portions of the optical sheets 110 overlap the lower side of the edge surface.

In the aforementioned LCD device according to an aspect of the present invention, if the light generated from the fluorescent lamp 60 enters the light guide plate 80, the light is reflected from the rear surface corresponding to the incline at a predetermined inclined angle and thus uniformly advances toward the emitting surface.

At this time, the light advancing to the lower surface of the light guide plate 80 is reflected by the reflection plate 100 and advances toward the emitting surface. The light emitted through the emitting surface of the light guide plate 80 is uniformly diffused to the whole area by the optical sheets 110.

The light generated from the back light unit enters the LCD panel.

The LCD panel selectively transmits the light from the back light unit to display images as its liquid crystal is driven by the voltage difference between a common electrode of the upper substrate and a pixel electrode of the lower substrate.

Figure 6:
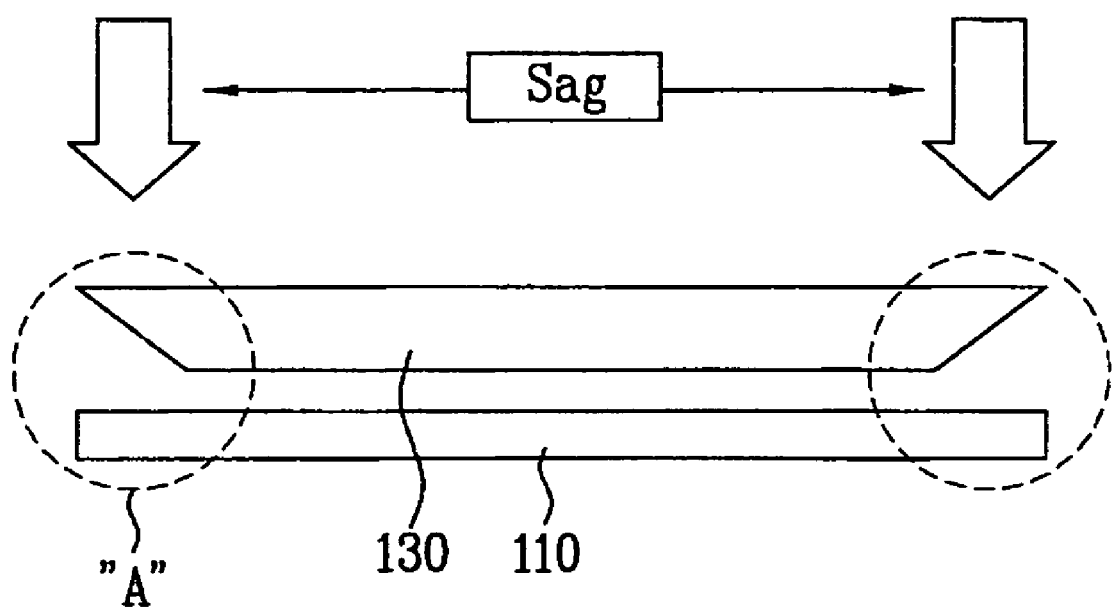
FIG. 6 illustrates a support main and optical sheets in an LCD device according to as aspect of the present invention.

FIG. 6 illustrates the support main and the optical sheets in the LCD device according to the present invention.

As shown in FIG. 6, the lower edge surface of the support main 130 overlapped with the optical sheets 110 is formed with a certain incline to obtain a certain gap with the optical sheets 110. In other words, four corners of the support main 130 having the edge surface have triangular grooves with a certain incline.

The incline is inclined from the overlapped surface of the optical sheets 110 to the outside.

Accordingly, a certain gap can be obtained between the optical sheets 110 and the support main 130 as shown by part A of FIG. 6.

In other words, four corners of the support main 130 may be more sagged than other portions during a fitting process, whereby the optical sheets 110 may be wrinkled under a high temperature. Therefore, triangular grooves are formed with a certain incline at four corners of the support main 130, so that a gap with the optical sheets is formed to prevent the optical sheets 110 from being wrinkled.

The gap between the optical sheets 110 and the support main 130 is in the range of 0.1 mm or greater.

As described above, the LCD device according to the present invention has the following advantage.

Since the gap is obtained between the optical sheets and the support main, the optical sheets can be prevented from being wrinkled at the corners under a high temperature.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device comprising:
    an LCD panel configured to display images;
    a back light unit including optical sheets for irradiating light to the LCD panel; and
    a support main partially overlapping side portions of the optical sheets and configured to receive the LCD panel and the back light unit, the support main having inclined edge surfaces at four corners to obtain a gap with the optical sheets, wherein the gap between the support main and the optical sheets is about 0.1 mm or greater and
    wherein the inclined edge surface has triangular grooves at the only four corners of the support main and the other side portion of the support main is parallel to the surface of the optical sheets.

2. The LCD device as claimed in claim 1, wherein the back light unit comprises:
    a fluorescent lamp configured to generate light;
    a lamp housing partially encircling the fluorescent lamp and having a U shape;
    a light guide plate guiding the light from the fluorescent lamp to the LCD panel; and
    a reflection plate disposed below the light guide plate to reflect the light advancing toward a lower surface of the light guide plate back toward an upper surface of the light guide plate,
    wherein the optical sheets are disposed on the light guide plate to uniformly diffuse and scatter the light passed through the light guide plate.

3. The LCD device as claimed in claim 2, wherein the light guide plate comprises a prism light guide plate.

4. An LCD device comprising:
    optical sheets configured to irradiate light to an LCD panel; and
    a support main partially overlapping side portions of the optical sheets, the support main having inclined edge surfaces at four corners thereof that create a gap between the inclined edge surfaces and the side portions of the optical sheets, wherein the gap between the inclined edge surfaces and the side portions of the optical sheets is about 0.1 mm or greater and
    wherein the inclined edge surface has triangular grooves at the only four corners of the support main and the other side portion of the support main is parallel to the surface of the optical sheets.

5. The LCD device as claimed in claim 4, wherein the inclined edge surfaces are inclined away from the side portions of the optical sheets toward an outside edge of the LCD device.

6. The LCD device as claimed in claim 4 further comprising:
- a fluorescent lamp configured to generate light;
- a lamp housing partially encircling the fluorescent lamp and having a U shape;
- a light guide plate guiding the light from the fluorescent lamp to the LCD panel; and
- a reflection plate disposed below the light guide plate to reflect the light advancing toward a lower surface of the light guide plate back toward an upper surface of the light guide plate,
- wherein the optical sheets are disposed on the light guide plate to uniformly diffuse and scatter the light passed through the light guide plate.

7. The LCD device as claimed in claim 4, wherein the support main is configured to receive the LCD panel at a position above the optical sheets such that the inclined edge surfaces are between the LCD panel and the optical sheets and face the optical sheets.

8. An LCD device comprising a support main configured to receive an LCD panel and to receive optical sheets that irradiate light to the LCD panel, wherein the support main includes inclined edge surfaces at four corners thereof that create a gap between the inclined edge surfaces and side portions of the optical sheets, wherein the gap between the inclined edge surfaces and the side portions of the optical sheets is about 0.1 mm or greater and
- wherein the inclined edge surface has triangular grooves at the only four corners of the support main and the other side portion of the support main is parallel to the surface of the optical sheets.

9. The LCD device as claimed in claim 8, wherein the inclined edge surfaces are inclined away from the side portions of the optical sheets toward an outside edge of the LCD device.

* * * * *